United States Patent [19]

Menke

[11] Patent Number: 5,796,918
[45] Date of Patent: Aug. 18, 1998

[54] METHOD FOR RANKING MEMBERSHIP FUNCTION VALUES OF LINGUISTIC INPUT VALUES IN A FUZZY LOGIC PROCESSOR AND ARRANGEMENT FOR THE IMPLEMENTATION THEREOF

[75] Inventor: Manfred Menke, Munich, Germany

[73] Assignee: Siemens Aktiengesellschaft, Munich, Germany

[21] Appl. No.: 705,865

[22] Filed: Aug. 28, 1996

[30] Foreign Application Priority Data

Aug. 28, 1995 [DE] Germany ................ 195 31 635.5

[51] Int. Cl.$^6$ .................................................. G06G 7/00
[52] U.S. Cl. ............................... 395/3; 395/61; 395/900
[58] Field of Search .................................. 395/3, 61, 900, 395/51

[56] References Cited

U.S. PATENT DOCUMENTS

| 5,398,299 | 3/1995 | Ota ................................................ 395/3 |
| 5,408,675 | 4/1995 | Florentino et al. ...................... 364/572 |
| 5,426,785 | 6/1995 | Coffield ............................... 395/800.17 |
| 5,586,217 | 12/1996 | Ota et al. .................................... 395/3 |

FOREIGN PATENT DOCUMENTS

| A-2 660 476 | 10/1991 | France . |
| 2 274 366 | 12/1994 | United Kingdom ........... H03H 17/00 |
| WO 95/08797 | 9/1994 | WIPO ........................... G06F 7/00 |
| 95/08797 | 3/1995 | WIPO ........................... G06F 7/00 |

OTHER PUBLICATIONS

C. Chakrabarti, et al., *Median Filter Architecture Based on Sorting Networks*, Proceedings of the International Symposium on Circuits and Systems, San Diego, May 10–13, 1992, Bd. 3 of 6, May 10, 1992, Institute of Electrical and Electronics Engineers, Seiten 1069–1072, XP000338132.

*Primary Examiner*—Tariq R. Hafiz
*Assistant Examiner*—Jason W. Rhodes
*Attorney, Agent, or Firm*—Hill & Simpson

[57] ABSTRACT

An ordering method for ranking membership function values (Wi) of linguistic input values (LWEi) in a fuzzy logic processor is presented The steps of the method are:

a) within the time of one processor clock, successively reading the membership function values (Wi) into holding elements (L1 ... L4) and, after every reading, outputs of the holding elements are through-connected onto outputs (A ... D) of a selector (SC) as determined by a selection signal (SEL);

b) comparing the signals at the outputs (A ... D) of the selector in comparators (C1,C2,C3) and generating control signals (S1 ... S3) for a unit (SELC) which in turn generates the new selection signal (SEL); and c) writing pointers (MAX, MAX', MAX", MIN', MIN) into position registers (P1 ... P5) with the assistance of the control signals (S1 ... S3) such that the pointers enable a ranked access to the membership function values (Wi) in the holding elements (L1 ... L4).

14 Claims, 2 Drawing Sheets

METHOD FOR RANKING MEMBERSHIP FUNCTION VALUES OF LINGUISTIC INPUT VALUES IN A FUZZY LOGIC PROCESSOR AND ARRANGEMENT FOR THE IMPLEMENTATION THEREOF

BACKGROUND OF THE INVENTION

There is a general object in the fuzzy logic processor art to minimize the memory space requirements for the rule base and to optimally enhance the processing speed. It is characteristic of a fuzzy logic system that at least two membership functions of linguistic values overlap, i.e. that at least two membership function values can occur for a sharp input value. Given an overlap degree of ü, up to ü linguistic values or, respectively, values of the membership functions of these linguistics values can, in general, be simultaneously hit by a sharp input value. In the extreme case, the conditional part of a rule can, understandably, contain comparisons with up to ü linguistic values for each input. Particularly given high overlap degrees, for example given ü=4, it is meaningful to abbreviate the conditional part of the rules with, for example, the operators defined below and to thus save memory space.

$$\text{NOT } \mu(LWE_i)=1-\mu(LWE_i);$$

$$\text{LNOT } \mu(LWE_j)=\max \mu(LWE_i); j \neq i$$

$$\text{INOR } \mu(LWE_k,LWE_m)=\max \mu(LWE_j); k \leq j \leq m$$

$$\text{XOR } \mu(LWE_k,LWE_m)=\max \mu(LWE_j); j \leq k \text{ or } m \leq j$$

For processing these operators, the maximum of ü membership function values of an input variable that are hit must be ranked/ordered according to size. So that the savings of memory space are not at the expense of a reduction in the processing speed, the ranking/ordering method must ensue within as few clocks (clock cycles) as possible. What is thereby ideal is an ordering of the affected membership function values within a single clock, since the ordering method can thereby ensue parallel to the fuzzification in any case. However, an ordering method within the time of two clocks also usually does not lead to any speed losses since fuzzy logic processors comprise a pipeline structure under certain circumstances and the additional clock is required anyway for loading the pipeline.

A fuzzy logic processor with a means for rule evaluation for an overlap degree of ü=4 is disclosed, for example, by the PCT application bearing the International Publication Number WO 95/08797, incorporated herein by reference, particularly FIG. 5.

SUMMARY OF THE INVENTION

It is an object of the invention to provide an ordering method and arrangements for the implementation thereof, whereby membership functions of linguistic input values can be ordered according to size within an optimally low number of clocks of the fuzzy logic processor, particularly for overlap degrees ü that are greater than or equal to 4.

In an embodiment, the invention provides an ordering method for ranking membership function values of linguistic input values in a fuzzy logic processor, comprising the steps of:

a) within the time of one processor clock, successively reading the membership function values into holding elements and, after every reading, outputs of the holding elements are through-connected onto outputs of selection means as determined by a selection signal;

b) comparing the signals at the outputs of the selection means in comparators and generating control signals for a unit which in turn generates the new selection signal; and c) writing pointers (MAX, MAX', MAX", MIN', MIN) into position registers with the assistance of the control signals such that the pointers enable a ranked access to the membership function values in the holding elements.

In an embodiment, the nvention provides a system for ranking membership values of linguistic input values in a fuzzy logic processor, comprising: a source of member function values; a distributor for distributing the membership function values; a plurality of holding elements coupled to the distributor for receiving said membership function values in succession; a selector circuit operatively coupled to the holding elements to redirect the membership function values at outputs thereof in accordance with a selection signal applied to the selection circuit; a plurality of comparators operatively coupled to the outputs of the selection circuit to generate first and second control signals; and means for generating the selection signal operatively coupled to receive the first and second control signal, said means for generating the selection signal including a plurality of position registers which contain pointers to the holding elements, said means for generating the selection signal operatively coupled to the selection circuit to apply the selection signal thereto, wherein:

a) within the time of one processor clock, the membership values are successively read into the holding elements and, after every reading, the membersip values in the holding elements are through-connected onto the outputs of the selection circuit as determined by a selection signal;

b) the signals at the outputs of the selection circuit are compared by the comparators which in turn generate control signals for the means for generating a selection signal which in turn generates the selection signal; and c) pointers are written into the position registers with the assistance of the control signals such that the pointers enable a ranked access to the membership function values in the holding elements.

A particular advantage of the invention is comprised therein that the implementation of the ordering method only requires a relatively slight added circuit outlay within a fuzzy logic processor since the components required therefor are already largely present in a rule processing logic of a fuzzy logic processor.

Further developments of the inventive method and arrangements for the implementation of the developments of the inventive method derive from the subclaims.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
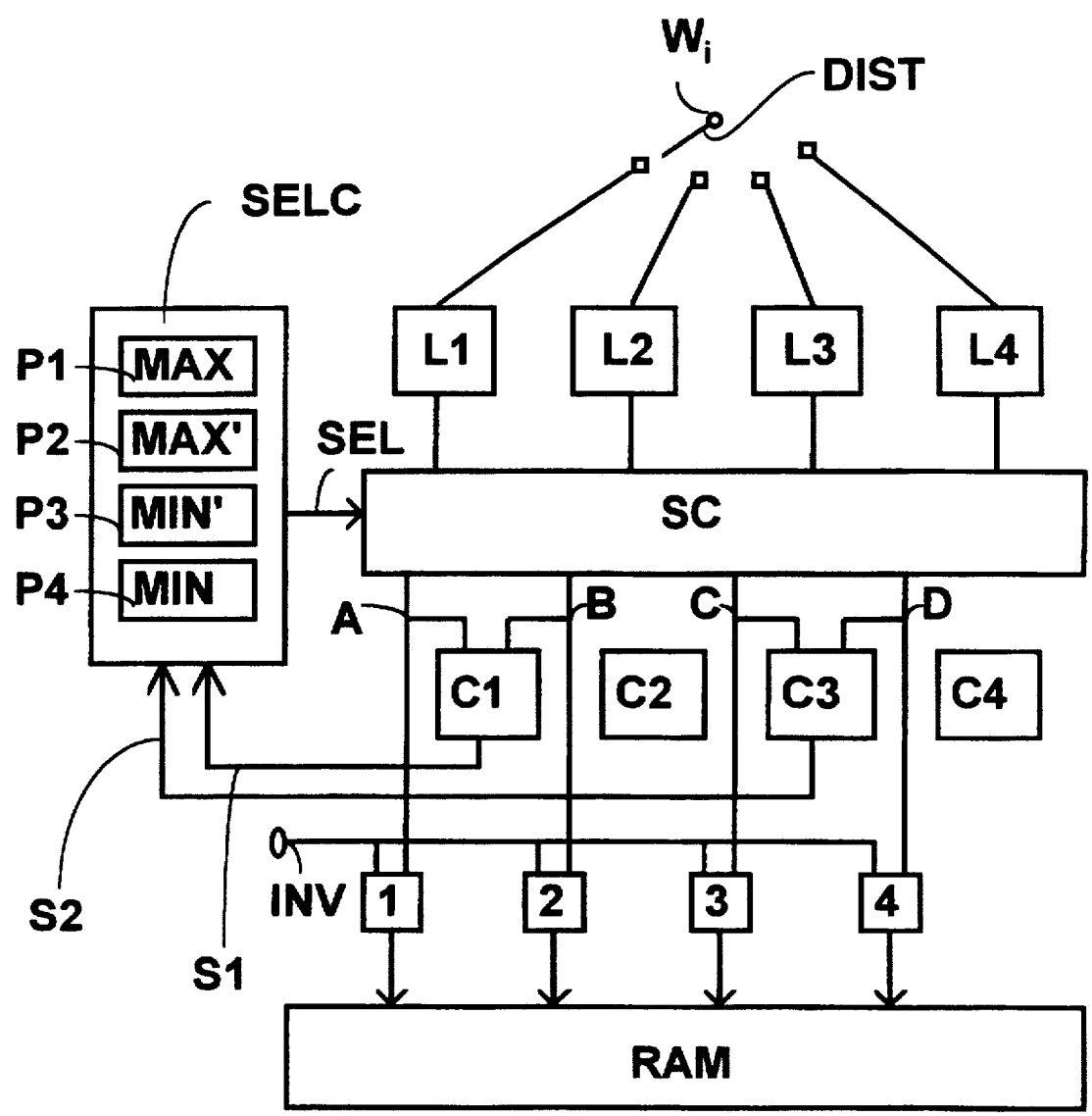
FIG. 1 illustrates a block circuit diagram for explaining the inventive method.

FIG. 1 shows a first arrangement for the implementation of the inventive ordering method for a maximum overlap degree of ü=4, whereby ü=4 denotes that a maximum of four membership function values $W_i$, with i=1–4, can occur for a sharp value of an input variable. The arrangement shown in FIG. 1 comprises four holding elements L1, L2, L3 and L4, a selection circuit SC, four comparators C1, C2, C3 and C4, four XOR circuits 12, 3 and 4, a memory RAM and a means SEL for forming a selection signal, and means SELC comprising position registers P1, P2, P3 and P4. A distributor DIST distributes the membership function $W_i$ to the holding elements in succession.

The XOR (exclusive OR) gates 1–4 are used for forming the initially cited NOT operator and can be correspondingly activated or deactivated by a corresponding inversion signal INV. In a first embodiment, for a maximum overlap degree of ü=4, only the comparator C1 and the comparator C3 of the comparators already present in a fuzzy logic processor are employed. The values $W_i$, with i=1–4, are successively supplied to the holding elements L1–L4 within a single processor clock. After every new value $W_i$ that is read in, the outputs of the holding elements L1–L4 are redirected in the selection circuit SC to outputs A, B, C and D of the selection circuit SC, the outputs A and B as well as C and D, respectively, being compared to each other with the assistance of the comparators C1 and C3 and position registers P1–P4 within the means SELC are updated with respect to their contents. The comparator C1 thereby supplies a control signal S1, and the comparator C3 supplies a control signal S2 to the means SELC. The position register P1 thereby contains a pointer MAX to the holding element with the current maximum value of $W_i$, and the position register P4 contains a pointer MIN to the holding element to the current minimum value of the value $W_i$. The position register P2 contains a pointer MAX' to the holding element with the next-smallest or same value as the maximum value of $W_i$ and the position register P3 contains a pointer MIN' to a holding element with the next-largest or same value as the minimum value $W_i$. Depending on the position registers P1–P4, the selection signal SEL—which is several bits wide—is formed in the unit SELC for the control of the selection means SC.

In the first embodiment, the current maximum is thereby connected to the output A and the current minimum is connected to the output D and the currently read-in value $W_i$ is connected onto the outputs B and C, in a further processor clock, a first value $W_i$ that does not correspond to the maximum or minimum value is connected onto the output A and a second value of $W_i$ that does not correspond to the maximum or minimum value is connected onto the output B in order to determine the pointers MAX' and MIN' in the position registers P2 and P3, and thus to enable an order access to the holding elements L1–L4 via the pointers MAX, MAX', MIN' and MIN.

In the general case of the inventive ordering method for a maximum overlap degree ü, membership function values are first successively read into ü holding elements (L1–L4) in the time of a first processor clock, and a respective maximum and minimum membership function value from all ü membership function values is determined within the first processor clock in that a new current maximum or, respectively, a new current minimum is respectively determined from a previous current maximum or, respectively, previous current minimum and a currently read-in membership function value, whereby a maximum and a minimum has been identified after the processing, i.e. the fuzzification here, of all ü membership values. After this and within a respective $k^{th}$ ordering routine, a respective maximum and minimum membership function value is determined from ü−2*k remaining membership values that do not correspond to the maximum or minimum in that a new current maximum or, respectively, a new current minimum is respectively simultaneously determined from as previous current maximum or, respectively, previous current minimum and a stored membership function value that has not yet been taken into consideration in this ordering routine, whereby a k+1$^{th}$ maximum and a k+1$^{th}$ minimum is identified after the processing of all ü−2*k membership values. This is repeated until only one or two membership values remain. Finally, insofar as ü is even-numbered, a last maximum and a last minimum are formed in a last processor clock from the two last membership function values.

Figure 2:
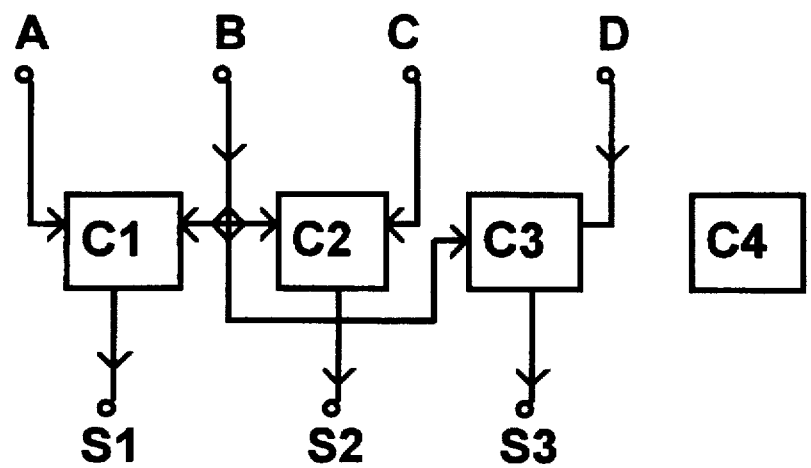
FIG. 2 illustrates a comparator portion of a second embodiment of the invention.

In a second embodiment for the implementation of a second development of the inventive method for a maximum overlap degree of ü=4, the three comparators C1, C2 and C3 are employed instead of only the two comparators used in the first embodiment, and these are thereby differently wired with the outputs A–D. As FIG. 2 shows, a first input of the comparator C1 is connected to output A and a second input of the comparator C1 is connected to the output B. Over and above this, the output B is connected both to a first input of the comparator C2 and a first input of the comparator C3. A second input of the comparator C2 is connected to the output C and a second input of the comparator C3 is connected to the output D. A further comparator C4 present for a fuzzy logic processor with a maximum overlap degree of ü=4 remains unused.

This second embodiment is suitable for a second development of the inventive ordering method wherein a maximum of four membership function values are likewise ordered. The advantage is thereby that the four membership function values are already present in ordered form after a single processor clock. For the implementation of the method, the current maximum value of $W_i$ is connected to the output A, the current minimum value of $W_i$ is connected to the output C and the currently read-in value $W_i$ is connected to the output B. Upon read-in of the fourth value $W_4$, the third value $W_3$ that did not correspond to the valid maximum of minimum after three values is thereby connected to the output D, and the position registers P1 . . . P4 already have their ultimate pointer occupation within a single processor clock, i.e. the contents of the holding elements L1 . . . L4 can be accessed in ordered fashion after this time. As above, an ordered access means that, for example, the holding element with the maximum value is read out first and all other holding elements are read out in descending sequence.

Figure 3:
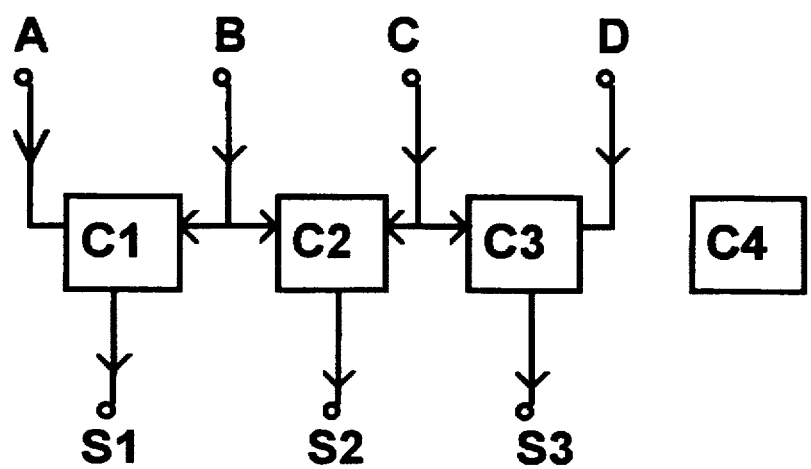
FIG. 3 illustrates a comparator portion of a third embodiment of the invention.

FIG. 3 shows an arrangement for the implementation of the inventive method for a maximum overlap degree of ü=5. Apart from an additional position register P5 for an additional pointer MAX" and a greater word length of the position register, the arrangement differs from the arrangement in FIG. 2 only therein that the first input of the comparator C3 is not wired to the output B but to the output C. In the inventive method for a maximum overlap degree of ü=5, the pointer MAX and the pointer MIN or, respectively, the holding elements that comprise the maximum value of $W_i$ and the minimum value of $W_i$, are determined first as in the first version of the inventive method with an overlap degree of ü=4. Subsequently, in a further processor clock, a first value that does not correspond to the maximum value or to the minimum value is connected to the output A and to the output D, a second value that does not correspond to the maximum or minimum value is connected to the output B and a third value that does not correspond to the maximum or minimum value is connected to the output C. The control signals S1–S3 formed in the comparators C1–C3 then effect a correct allocation of the further pointers.

The inventive method for an overlap degree of ü=5 is shown by way of example below in the form of two tables. The membership function values Wi are unordered and should satisfy the inequation $W_5<W_4<W_1<W_2<W_3$. The entry "X" means arbitrary.

| L1 | L2 | L3 | L4 | L5 | A | B | C | D | P1 | P2 . . . P4 | P5 |
|---|---|---|---|---|---|---|---|---|---|---|---|
| $W_1$ | X | X | X | X | $W_1$ | $W_1$ | X | $W_1$ | X | 10000 | XXX | 10000 |
| $W_1$ | $W_2$ | X | X | X | | $W_1$ | $W_2$ | $W_1$ | X | 01000 | XXX | 10000 |
| $W_1$ | $W_2$ | $W_3$ | X | X | | $W_2$ | $W_3$ | $W_1$ | X | 00100 | XXX | 10000 |
| $W_1$ | $W_2$ | $W_3$ | $W_4$ | X | | $W_3$ | $W_4$ | $W_1$ | X | 00100 | XXX | 00010 |
| $W_1$ | $W_2$ | $W_3$ | $W_4$ | $W_5$ | | $W_3$ | $W_5$ | $W_4$ | X | 00100 | XXX | 00001 |
| $W_1$ | $W_2$ | $W_3$ | $W_4$ | $W_5$ | | $W_1$ | $W_2$ | $W_4$ | $W_1$ | 00100 | XXX | 00001 |

After the fifth step, the holding element with the maximum value is determined via the position pointer MAX and the holding element with the minimum value is determined via the position pointer MIN. In the example here, the maximum value in the holding element L3 is indicated via the logical one in the pointer MAX=00100 and the minimum in the holding element L5 is indicated by the pointer MIN=00001. The three values $W_1$, $W_2$ and $W_3$ are compared in the next step. This sequences as follows: when, for example, the control signal S1 is formed by the comparison A>B, the control signal S2 is formed by the comparison B>C and the control signal S3 is formed by the comparison C>D, a "one" in the following table means that the respective greater than condition has ensued.

| S1 A > B | S2 B > C | S3 C > D | Significance | P2 MAX' | P3 MAX" | P4 MIN' | Example |
|---|---|---|---|---|---|---|---|
| 0 | 0 | X | $W_A \leq W_B \leq W_C$ | 00X1X | 01X0X | 10X0X | $W_1 \leq W_2 \leq W_4$ |
| 1 | 1 | X | $W_A > W_B > W_C$ | 10X0X | 01X0X | 00X1X | $W_1 > W_2 > W_4$ |
| 0 | 1 | 0 | $W_C \leq W_A \leq W_B$ | 01X0X | 10X0X | 00X1X | $W_4 \leq W_1 \leq W_2$ |
| 0 | 1 | 1 | $W_B > W_C > W_A$ | 01X0X | 00X1X | 10X0X | $W_2 > W_4 > W_1$ |
| 1 | 0 | 0 | $W_B \leq W_C \leq W_A$ | 10X0X | 00X1X | 01X0X | $W_2 \leq W_4 \leq W_1$ |
| 1 | 0 | 1 | $W_C > W_A > W_B$ | 00X1X | 10X0X | 01X0X | $W_4 > W_1 > W_2$ |

The allocation between the outputs A–D and the inputs of the comparators need not be hard-wired in any embodiment but can be effected by switches or, respectively, multiplexers, as a result whereof the arrangement can be utilized both for the implementation of the inventive ordering method as well as for rule evaluation. Advantageously, the ü position registers P1,P2 . . . respectively comprises a word length of ü bits and a respective holding element is marked as bit significant with a logical one at a corresponding location in the position register.

Although modifications and changes may be suggested by those skilled in the art, it is the intention of the inventors to embody within the patent warranted hereon all changes and modifications as reasonably and properly come within the scope of their contribution to the art.

What is claimed is:

1. An ordering method for ranking membership function variables of linguistic input values in a fuzzy logic processor, comprising the steps of:

a) within the time period of one processor clock, successively reading the membership function values into holding elements and, after every reading, through connecting outputs of the holding elements onto outputs of a selection circuit as determined by a selection signal;

b) comparing the signals at the outputs of the selection circuit and generating control signals for a unit which in turn generates the selection signal; and c) writing pointers into position registers with the assistance of the control signals such that the pointers enable a ranked access to the membership function values in the holding elements, wherein, in the time of the first processor clock, ü membership function values are successively read into ü holding elements and a respective maximum and minimum membership function value from all ü membership function values is determined in that a new current maximum or, respectively, a new current minimum is respectively determined from a previous current maximum or, respectively, previous current minimum and a currently read-in membership function value, whereby a first maximum and a first minimum has been identified after the processing of all ü membership values;

wherein, within a respective, following $k^{th}$ processor clock, k being greater than or equal to 1, a respective maximum and minimum membership function value is respectively simultaneously determined from ü–2*k remaining membership values that do not correspond to the maximum or minimum in that a new current maximum or, respectively, a new current minimum is respectively simultaneously determined from as previous current maximum or, respectively, previous current minimum and a stored membership function value that has not yet been taken into consideration in this processor clock, whereby a $k+1^{th}$ maximum and a $k+1^{th}$ minimum is identified after the processing of all ü–2*k membership values;

wherein the preceding step is repeated within one or more, respective, further, following processor clock, if necessary, until only one or two remaining membership values remain; and wherein, insofar as ü is even-numbered, a last maximum and a last minimum are formed in a last processor clock from the two last membership function values.

2. The method according to claim 1, wherein four membership function values are successively read into four holding elements in the time of a first processor clock;

wherein, for respectively all membership function values, the current maximum membership function value is connected to a first output, the current minimum membership function value is connected to a fourth output and the currently read-in membership function value is connected onto second and third outputs of the selection means;

wherein, in a second processor clock, the penultimate membership function value is connected onto the first output and the last membership function value is connected onto the second output; and wherein a first control signal is formed with the assistance of a first of the comparators, and further pointers are written into position registers with the assistance of the further control signal such that a first further pointer points to a holding element with a membership function value that is the next smaller or the same compared to the maximum membership function value, and such that a second further pointer points to a holding element with a membership function value that is the next-larger or the same compared to the minimum membership function value.

3. A system for the implementation of the method according to claim 2, wherein the first output is connected to a first input of a first comparator, a second output is connected to a second input of the first comparator, the first input of a second comparator and a first input of a third comparator;

wherein a third output is connected to a second input of the second comparator and a fourth output is connected to a second input of the third comparator; and wherein the first comparator generates a first control signal, the second comparator generates a second control signal and the third comparator generates a third control signal.

4. A system for the implementation of the method according to claim 1, wherein a first output is connected to a first input of a first comparator and a second output is connected to a second input of the first comparator, said first comparator supplying a first control signal; and wherein a third output is connected to a first input of a second comparator and a fourth output is connected to a second input of the second comparator, said second comparator supplying a second control signal.

5. An ordering method for ranking membership function variables of linguistic input values in a fuzzy logic processor, comprising the steps of:

a) within the time period of one processor clocking, successively reading the membership function values into holding elements and, after every reading, through connecting outputs of the holding elements onto outputs of a selection circuit as determined by a selection signal;

b) comparing the signals at the outputs of the selection circuit and generating control signals for a unit which in turn generates the selection signal; and c) writing pointers into position registers with the assistance of the control signals such that the pointers enable a ranked access to the membership function values in the holding elements, wherein four membership function values are successively read into four holding elements in the time of one processor clocking;

wherein, respectively for all membership function values, the current maximum membership function value is connected onto a first output, the current minimum membership function value is connected onto a third output and the currently read-in membership function value is connected onto a second output of the selection means; and wherein, upon read-in of the fourth membership function value, the third membership function value is connected onto a fourth output of the selection means.

6. A system for the implementation of the method according to claim 5, wherein the first output is connected to a first input of a first comparator;

wherein the second output is connected to a second input of a first comparator and to a first input of a second comparator;

wherein the third output is connected to a second input of the second comparator and to a first input of a third comparator;

wherein the fourth output is connected to a second input of the third comparator; and wherein the first comparator generates a first control signal, the second comparator generates a second control signal and the third comparator generates a third control signal.

7. An ordering method for ranking membership function values of linguistic input variables in a fuzzy logic processor, comprising the steps of:

a) within the time period of one processor clock, successively reading the membership function values into holding elements and, after every reading, through connecting outputs of the holding elements onto outputs of a selection circuit as determined by a selection signal;

b) comparing the signals at the outputs of the selection circuit and generating control signals for a unit which in turn generates the selection signal; and c) writing pointers into position registers with the assistance of the control signals such that the pointers enable a ranked access to the membership function values in the holding elements, wherein five membership function values are successively read into five holding elements in the time of one processor clock;

wherein, respectively for all five membership function values, the current maximum membership function value is connected onto a first output, the current minimum membership function value is connected onto a fourth output and the currently read-in membership function value is connected onto second and third outputs of the selection means;

wherein a maximum membership function value and a minimum membership function value is determined with the assistance of comparators;

wherein, in the time of a further processor clock, a first membership function value that does not correspond to the maximum membership function value or to the minimum membership function value is connected onto the first output and the fourth output, a second membership function value that does not correspond to the maximum membership function value or to the minimum membership function value is connected onto the second output and a third membership function value that does not correspond to the maximum membership function value or to the minimum membership function value is connected onto the third output;

wherein the signals of the first and second outputs, the signals of the second and third outputs and the signals of the third and fourth outputs are compared and three control signals are formed dependent thereon; and wherein three further pointers are written into three further position registers by the three control signals such that the pointers point to holding elements with membership function values that are not the maximum membership function value or the minimum membership function value and enable an access onto these membership function values that is ordered according to the size.

8. A system according to any of the claims 3, 4, or 7, wherein a respective position register is provided for the largest membership function value pointer, the next-largest membership function value, down to the smallest membership function value and the next smallest membership function value, to be read in within a processor clock, wherein the word length of the position registers, respectively, corresponds to the maximum plurality of membership function values that can be read in, and wherein the holding element that contains the membership function value is bit-significant marked by a logical one at the corresponding location in the respective position register.

9. A system for ranking membership function values of linguistic input values in a fuzzy logic processor, comprising:

a source of membership function values;

a distributor for distributing the membership function values;

a plurality of holding elements coupled to the distributor for receiving said membership function values in succession;

a selector circuit operatively coupled to the holding elements to redirect the membership function values at outputs thereof in accordance with a selection signal applied to the selection circuit;

a plurality of comparators operatively coupled to the outputs of the selection circuit to generate first and second control signals; and means for generating the selection signal operatively coupled to receive the first and second control signal, said means for generating the selection signal including a plurality of position registers which contain pointers to the holding elements, said means for generating the selection signal operatively coupled to the selection circuit to apply the selection signal thereto, wherein:

a) within the time of one processor clock, the membership values are successively read into the holding elements and, after every reading, the membersip function values in the holding elements are through-connected onto the outputs of the selection circuit as determined by a selection signal;

b) the signals at the outputs of the selection circuit are compared by the comparators which in turn generate control signals for the means for generating a selection signal which in turn generates the selection signal; and c) pointers are written into the position registers with the assistance of the control signals such that the pointers enable a ranked access to the membership function values in the holding elements.

10. A system for ranking membership function values of linguistic input values in a fuzzy logic processor, comprising:

a source of membership function values;

a distributor for distributing the membership function values;

a plurality of holding elements coupled to the distributor for receiving said membership function values in succession;

a selector circuit operatively coupled to the holding elements to redirect the membership function values at outputs thereof in accordance with a selection signal applied to the selection circuit;

a plurality of comparators operatively coupled to the outputs of the selection circuit to generate first and second control signals; and means for generating the selection signal operatively coupled to receive the first and second control signal, said means for generating the selection signal including a plurality of position registers which contain pointers to the holding elements, said means for generating the selection signal operatively coupled to the selection circuit to apply the selection signal thereto, wherein:

a) within the time of one processor clock, the membership values are successively read into the holding elements and, after every reading, the membership function values in the holding elements are through-connected onto the outputs of the selection circuit as determined by a selection signal;

b) the signals at the outputs of the selection circuit are compared by the comparators which in turn generate control signals for the means for generating a selection signal which in turn generates the selection signal;

c) pointers are written into the position registers with the assistance of the control signals such that the pointers enable a ranked access to the membership function values in the holding elements;

d) in the time of the first processor clock, $\ddot{u}$ membership function values are successively read into $\ddot{u}$ holding elements and a respective maximum and minimum membership function value from all $\ddot{u}$ membership function values is determined in that a new current maximum or, respectively, a new current minimum is respectively determined from a previous current maximum or, respectively, previous current minimum and a currently read-in membership function value, whereby a first maximum and a first minimum has been identified after the processing of all $\ddot{u}$ membership values;

e) within a respective, following $k^{th}$ processor clock, k being greater than or equal to 1, a respective maximum and minimum membership function value is respectively simultaneously determined from $\ddot{u}-2*k$ remaining membership values that do not correspond to the maximum or minimum in that a new current maximum or, respectively, a new current minimum is respectively simultaneously determined from as previous current maximum or, respectively, previous current minimum and a stored membership function value that has not yet been taken into consideration in this processor clock, whereby a $k+1^{th}$ maximum and a $k+1^{th}$ minimum is identified after the processing of all $\ddot{u}-2*k$ membership values;

11 f) the preceding step is repeated within one or more, respective, further, following processor clock, if necessary, until only one or two remaining membership values remain; and g) insofar as ü is even-numbered, a last maximum and a last minimum are formed in a last processor clock from the two last membership function values.

11. A system for ranking membership function values of linguistic input values in a fuzzy logic processor, comprising:

a source of membership function values;

a distributor for distributing the membership function values;

a plurality of holding elements coupled to the distributor for receiving said membership function values in succession;

a selector circuit operatively coupled to the holding elements to redirect the membership function values at outputs thereof in accordance with a selection signal applied to the selection circuit;

a plurality of comparators operatively coupled to the outputs of the selection circuit to generate first and second control signals; and means for generating the selection signal operatively coupled to receive the first and second control signal, said means for generating the selection signal including a plurality of position registers which contain pointers to the holding elements, said means for generating the selection signal operatively coupled to the selection circuit to apply the selection signal thereto, wherein:

a) within the time of one processor clock, the membership values are successively read into the holding elements and, after every reading, the membership function values in the holding elements are through-connected onto the outputs of the selection circuit as determined by a selection signal;

b) the signals at the outputs of the selection circuit are compared by the comparators which in turn generate control signals for the means for generating a selection signal which in turn generates the selection signal;

c) pointers are written into the position registers with the assistance of the control signals such that the pointers enable a ranked access to the membership function values in the holding elements;

d) a first output of the selection circuit is connected to a first input of a first comparator and a second output of the selection circuit is connected to a second input of the first comparator, said first comparator supplying a first control signal; and e) a third output of the selection circuit is connected to a first input of a second comparator and a fourth output of the selection circuit is connected to a second input of the second comparator, said second comparator supplying a second control signal.

12. A system for ranking membership function values of linguistic input values in a fuzzy logic processor, comprising:

a source of membership function values;

a distributor for distributing the membership function values;

a plurality of holding elements coupled to the distributor for receiving said membership function values in succession;

12 a selector circuit operatively coupled to the holding elements to redirect the membership function values at outputs thereof in accordance with a selection signal applied to the selection circuit;

a plurality of comparators operatively coupled to the outputs of the selection circuit to generate first and second control signals; and means for generating the selection signal operatively coupled to receive the first and second control signal, said means for generating the selection signal including a plurality of position registers which contain pointers to the holding elements, said means for generating the selection signal operatively coupled to the selection circuit to apply the selection signal thereto, wherein:

a) within the time of one processor clock, the membership values are successively read into the holding elements and, after every reading, the membership function values in the holding elements are through-connected onto the outputs of the selection circuit as determined by a selection signal;

b) the signals at the outputs of the selection circuit are compared by the comparators which in turn generate control signals for the means for generating a selection signal which in turn generates the selection signal;

c) pointers are written into the position registers with the assistance of the control signals such that the pointers enable a ranked access to the membership function values in the holding elements;

d) a first output of the selection circuit is connected to a first input of a first comparator, a second output of the selection circuit is connected to a second input of the first comparator, a first input of a second comparator and a first input of a third comparator;

e) a third output of the selection circuit is connected to a second input of the second comparator and a fourth output of the selection circuit is connected to a second input of the third comparator; and f) the first comparator generates a first control signal, the second comparator generates a second control signal and the third comparator generates a third control signal.

13. A system for ranking membership function values of linguistic input values in a fuzzy logic processor, comprising:

a source of membership function values;

a distributor for distributing the membership function values;

a plurality of holding elements coupled to the distributor for receiving said membership function values in succession;

a selector circuit operatively coupled to the holding elements to redirect the membership function values at outputs thereof in accordance with a selection signal applied to the selection circuit;

a plurality of comparators operatively coupled to the outputs of the selection circuit to generate first and second control signals; and means for generating the selection signal operatively coupled to receive the first and second control signal, said means for generating the selection signal including a plurality of position registers which contain pointers to the holding elements, said means for generating the selection signal operatively coupled to the selection circuit to apply the selection signal thereto, wherein:
- a) within the time of one processor clock, the membership values are successively read into the holding elements and, after every reading, the membership function values in the holding elements are through-connected onto the outputs of the selection circuit as determined by a selection signal;
- b) the signals at the outputs of the selection circuit are compared by the comparators which in turn generate control signals for the means for generating a selection signal which in turn generates the selection signal;
- c) pointers are written into the position registers with the assistance of the control signals such that the pointers enable a ranked access to the membership function values in the holding elements;
- d) a first output of the selection circuit is connected to a first input of the first comparator;
- e) a second output of the selection circuit is connected to a second input of the first comparator and to a first input of a second comparator;
- f) a third output of the selection circuit is connected to a second input of the second comparator and to a first input of a third comparator;
- g) a fourth output of the selection circuit is connected to a second input of the third comparator; and
- h) the first comparator generates a first control signal, the second comparator generates a second control signal and the third comparator generates a third control signal.

14. A system according to any of the claims 11 through 13, wherein a respective position register is provided for the largest membership function value pointer, the next-largest membership function value, the smallest membership function value, and the next to the smallest membership function value, and wherein the word length of the position registers, respectively, corresponds to the maximum plurality of membership function values that can be read in.

* * * * *